(12) United States Patent
Kang et al.

(10) Patent No.: US 9,861,122 B2
(45) Date of Patent: Jan. 9, 2018

(54) SHELF-STABLE, PRESERVATIVE-FREE LIQUID BEVERAGE ENHANCER PRODUCTS

(71) Applicants: Young Kang, Alpharetta, GA (US); Joe Farinella, Chicago, IL (US); Kathryn Frothingham, Chicago, IL (US); Justin Kozlowski, Chicago, IL (US); Holly Lynch, Chicago, IL (US); John Higgs, Chicago, IL (US)

(72) Inventors: Young Kang, Alpharetta, GA (US); Joe Farinella, Chicago, IL (US); Kathryn Frothingham, Chicago, IL (US); Justin Kozlowski, Chicago, IL (US); Holly Lynch, Chicago, IL (US); John Higgs, Chicago, IL (US)

(73) Assignee: AMT Group, LLC, Niles ( * ) Notice: Subject to any disclaimer, the term of this patent is extended or adjusted under 35 U.S.C. 154(b) by 0 days.

(21) Appl. No.: 14/257,198

(22) Filed: Apr. 21, 2014

(65) Prior Publication Data
US 2015/0140177 A1 May 21, 2015

Related U.S. Application Data

(60) Provisional application No. 61/907,163, filed on Nov. 21, 2013.

(51) Int. Cl.
*A23L 2/56* (2006.01)
*A23C 9/156* (2006.01)
(Continued)

(52) U.S. Cl.
CPC ............... *A23L 2/56* (2013.01); *A23C 9/156* (2013.01); *A23L 2/52* (2013.01); *A23L 2/58* (2013.01);
(Continued)

(58) Field of Classification Search
CPC ......... A23L 2/42; A23L 2/44; A23V 2200/04; A23V 2200/10; A23V 2250/08; A23V 2250/082; A23V 2250/086
(Continued)

(56) References Cited

U.S. PATENT DOCUMENTS 3,118,769 A * 1/1964 Pletcher ............... A23C 9/1307
426/250
2005/0126632 A1 * 6/2005 Farrell ............... B65D 51/2814
137/155

(Continued)

*Primary Examiner* — Helen F Heggestad
(74) *Attorney, Agent, or Firm* — Kohn & Associates PLLC (57) ABSTRACT

A liquid beverage enhancer product including a shelf-stable highly concentrated liquid flavor and color solution including at least 10% non-water solvents with humectant properties including propylene glycol, glycerol, ethanol and other alcohols. The liquid beverage enhancer product in combination with beverages or non-beverage food products. A method of enhancing a beverage by adding a liquid beverage enhancer product including a shelf-stable highly concentrated liquid flavor and color solution having at least 10% non-water solvents with humectant properties to a beverage, and enhancing the flavor and color of the beverage. A method of enhancing milk, milk substitute beverages, and protein containing products, by adding the liquid beverage enhancer product having a pH of greater than 4.6 to milk, milk substitute beverages, or protein containing products, and enhancing the flavor and color of the milk, milk substitute beverages, or protein containing products without curdling.

2 Claims, 5 Drawing Sheets

(51) Int. Cl.
    *A23L 2/58*     (2006.01)
    *A23L 2/52*     (2006.01)
    *A23L 27/00*    (2016.01)
    *A23L 5/42*     (2016.01)
(52) U.S. Cl.
    CPC ............. *A23L 5/42* (2016.08); *A23L 27/00* (2016.08); *A23V 2002/00* (2013.01)
(58) Field of Classification Search
    USPC .................. 426/590, 656, 650, 130, 584
    See application file for complete search history.

(56) References Cited

U.S. PATENT DOCUMENTS

| | | | |
|---|---|---|---|
| 2007/0166336 A1* | 7/2007 | Delmarre et al. | 424/400 |
| 2008/0020115 A1* | 1/2008 | Guerrero | A47J 31/402 |
| | | | 426/533 |
| 2011/0021639 A1* | 1/2011 | Paik et al. | 514/729 |

* cited by examiner

CHALLENGE STUDY RESULTS
TEMPERATURE= 23-25°C
QL No. 1: Strawberry Milk Enhancer 154-001-05-40 9-10-13

| Q LAB # | INOCULATING ORGANISM(S) | INOCULUM LEVEL (CFU/g of sample) | INITIAL COUNT CFU/g (prior to inoculation) | | | | | TIME INTERVAL | | | | | | |
|---|---|---|---|---|---|---|---|---|---|---|---|---|---|---|
| | | | Yeast | Mold | E. coli | Lactobacillus | C. perfringens | Initial | Week 1 | Week 2 | Week 3 | Week 4 | Week 5 | Week 6 |
| 1 | Penicillium corylophilum (ATCC 18307) | $1.9 \times 10^3$ | | | | | | $1.8 \times 10^3$ | <10 | <10 | <10 | <10 | <10 | <10 |
| | Zygosaccharomyces bailii (ATCC 36947) | $2.8 \times 10^2$ | | | | | | $4.0 \times 10^1$ | <10 | <10 | <10 | <10 | <10 | <10 |
| | Escherichia coli (ATCC 8739) | $2.4 \times 10^4$ | | | | | | $3.0 \times 10^3$ | <10 | <10 | <10 | <10 | <10 | <10 |
| | Aspergillus brasiliensis (ATCC 16404) | $7.0 \times 10^1$ | <10 | <10 | <10 | | <10 | $8.0 \times 10^1$ | <10 | <10 | <10 | <10 | <10 | <10 |
| | Saccharomyces cerevisiae (ATCC 9896) | $7.0 \times 10^2$ | | | | | | $1.2 \times 10^2$ | <10 | <10 | <10 | <10 | <10 | <10 |
| | Lactobacillus casei (ATCC 11578) | $8.0 \times 10^2$ | | | | | | $8.3 \times 10^2$ | <10 | <10 | <10 | <10 | <10 | <10 |
| | Clostridium perfringens (ATCC 3624) | $2.7 \times 10^4$ | | | | | | $4.4 \times 10^3$ | <10 | <10 | <10 | <10 | <10 | <10 |
| | APPEARANCE | | | | | | | No Visible Growth | No Visible Growth | No Visible Growth | No Visible Growth | No Visible Growth | No Visible Growth | No Visible Growth |

FIGURE 3B

*Water Activity (Aw) prior to Inoculation*

| Q LAB # | Aw |
|---|---|
| 1 | 0.869 |

FIGURE 4A

CHALLENGE STUDY RESULTS
TEMPERATURE= 23-25°C

QL No.1: 153-007-05-31 Lemongrass Mint Natural LWE

| Q LAB # | INOCULATING ORGANISM(S) | INOCULUM LEVEL (CFU/g of sample) | INITIAL COUNT CFU/g (prior to inoculation) | | | | TIME INTERVAL | | | | | |
|---|---|---|---|---|---|---|---|---|---|---|---|---|
| | | | Yeast | Mold | E. coli | Lactobacillus | Initial | Week 1 | Week 2 | Week 3 | Week 4 | Week 5 | Week 6 |
| 1 | Penicillium corylophilum (ATCC 18307) | $1.1 \times 10^3$ | <10 | <10 | <10 | <10 | $3.8 \times 10^2$ | <10 | <10 | <10 | <10 | <10 | <10 |
| | Zygosaccharomyces bailii (ATCC 36947) | $1.6 \times 10^2$ | | | | | <10 | <10 | <10 | <10 | <10 | <10 | <10 |
| | Escherichia coli (ATCC 8739) | $1.4 \times 10^3$ | | | | | <10 | <10 | <10 | <10 | <10 | <10 | <10 |
| | Aspergillus brasiliensis (ATCC 16404) | $1.2 \times 10^2$ | | | | | $2.0 \times 10^2$ | <10 | <10 | <10 | <10 | <10 | <10 |
| | Saccharomyces cerevisiae (ATCC 9896) | $3.6 \times 10^2$ | | | | | $4.0 \times 10^1$ | <10 | <10 | <10 | <10 | <10 | <10 |
| | Lactobacillus casei (ATCC 11578) | $1.4 \times 10^3$ | | | | | <10 | <10 | <10 | <10 | <10 | <10 | <10 |
| | APPEARANCE | | | | | | No Visible Growth | No Visible Growth | No Visible Growth | No Visible Growth | No Visible Growth | No Visible Growth | No Visible Growth |

*Water Activity (Aw) prior to Inoculation*

| Q LAB # | Aw |
|---|---|
| 1 | 0.848 |

SHELF-STABLE, PRESERVATIVE-FREE LIQUID BEVERAGE ENHANCER PRODUCTS

BACKGROUND OF THE INVENTION

1. Technical Field

The present invention relates to formulations of highly concentrated liquid flavor, sweetener, and color solutions that are added to a beverage in order to improve its flavor and color (i.e., liquid beverage enhancers). More specifically, the present invention relates to liquid beverage enhancers that can be shelf-stable, natural, preservative-free, high pH and/or added to milk or other protein containing products.

2. Background Art

"Liquid water enhancers" are a new line of products started with the launch of Kraft MIO®. These products are highly concentrated flavor, acid, sweetener, and color solutions that are added to water in very small amounts to enhance its flavor and color. For most products in the category, the serving size is 2 mL of liquid water enhancer per 8 fluid ounces of water. The MIO® (Kraft) line of products are the most recognizable brand in the liquid water enhancer segment. The user squeezes the MIO® liquid directly into water to enhance the flavor and color. This growing market has expanded into other, more functional, types of water enhancers such as MIO FIT® which adds caffeine and MIO SPORT® which adds electrolytes and B vitamins. Other liquid water enhancers include STUR® (Dyla) and Dasani DROPS™ (Coca-Cola).

Given the market success of liquid water enhancers, it is desirable to expand this product category to concentrated flavor & color products intended to enhance beverages other than water (i.e. milk, coffee, tea, juice, beer, alcohol, soft drinks etc.). Such products would fall under a new category of products called, "liquid beverage enhancers". Typical liquid water enhancer products may not work in beverages other than water due to the physical properties of the liquids. For example, typical liquid water enhancer products are formulated at a low pH (less than pH 3) with added preservatives in order to ensure microbiological stability. This preservation system does not work for a liquid beverage enhancer intended to be added to milk because the high levels of acid will cause the milk to curdle, resulting in an unpleasant consumer experience and an uneven distribution of flavor and color. Slightly reduced curdling could be achieved by a significant reduction in the amount of liquid beverage enhancer added to the milk, but that would result in significantly reduced flavor and color impact.

Preserving a liquid beverage enhancer via low pH and use of conventional preservatives (i.e. sodium benzoate, potassium sorbate, etc) is undesirable because many consumers have a negative perception of these ingredients. The use of preservatives also precludes one from labeling a product as "natural", "all natural" or "organic".

Another disadvantage to preserving a liquid beverage enhancer via reduced pH (below 3.0) plus preservatives is that it is more difficult to deliver flavors that are better complemented by a less acidic media. For example, it would be difficult to deliver a great tasting chocolate flavor at such a low pH since acid is not very compatible with a true chocolate profile.

An additional benefit to stabilizing a liquid beverage enhancer at a higher pH (without the addition of significant amounts of acid) is that, in certain applications, it may not be desired to alter the pH of the finished beverage (beverage+liquid beverage enhancer). For example, it may be desired to add peach flavor to a tea without increasing the tartness or astringency. If a traditional, reduced pH plus preservative liquid beverage enhancer was used, this would not be possible.

In theory, it would be possible to make a shelf-stable liquid beverage enhancer product without preservatives through traditional thermal processes, but such processes are expensive due to added equipment and packaging costs and would degrade the flavor and color components in the product. It would also be feasible, in theory, to make a shelf-stable, preservative-free liquid beverage enhancer product through alternate food and beverage processing technologies, such as high pressure, irradiation or UV, but these options are also undesirable due to the high cost of equipment. A further drawback to a non-preserved product made shelf-stable via processing methods (thermal, irradiation, high pressure, etc.) is that once the bottles are opened and used by the consumer, the product inside would be highly susceptible to microbiological contamination. It is common for the current liquid water enhancers on the market to be labeled "use within 30 days of opening", but such a shelf-life would be drastically reduced if the product was made shelf-stable by means of processing technologies only. Such a product would need to be labeled, "refrigerate after opening" since there would be no little to no protection (especially in a higher pH product) from microbiological contamination. Even with refrigeration, the product may not be able to meet the standard "use within 30 days of opening" common to other liquid water enhancers.

U.S. Patent Application No. 2012/0251687 to VanDijk, et al. discloses a stable alcoholic milk and/or soy protein-based drink with a pH ranging from 5.2-6.5 comprising at least one or more milk and/or soy proteins, alcohol and one or more stabilizers. VanDijk, et al. also discloses a method for preparing the drinks, comprising at least one or more milk and/or soy proteins, which method comprises: a) mixing at least a portion of the milk and/or soy proteins and at least a portion of the stabilizers in an aqueous medium to obtain a mixture; b) setting the pH of the mixture to 3.5-4.4; c) homogenizing the mixture obtained in step b) to obtain a homogenate; d) setting the pH of the homogenate to 5.2-6.5; and e) mixing in the alcohol and optionally a residual portion of the milk and/or soy proteins and of the stabilizers during or after one or more of steps a)-d). VanDijk, et al. discloses a pre-mixed drink and not a beverage enhancer. VanDijk, et al. further does not disclose a beverage enhancer that has a water activity level below 0.85 and is preservative free.

U.S. Patent Application No. 2013/0316066 to Brown, et al. discloses concentrated liquid flavorings and methods of preparing flavored beverages using the concentrated liquid flavorings. The concentrated liquid flavorings can provide flavor to a beverage, such as coffee, tea, juice, milk, or other savory beverages. The concentrated liquid flavorings may be provided in a convenient, portable and dosable format that can be easily used by a consumer to provide the desired amount of flavor to a beverage. The concentrated liquid flavorings are shelf stable for prolonged storage times at ambient temperatures. Shelf stability is provided, at least in part, by acidic pH and/or reduced water activity (less than 0.84) to control microbial growth. 5 to 90% water can be included. Non-aqueous liquid (NAL) such as propylene glycol, glycerol, or alcohol can be included below about 30%. Sodium citrate or other buffers can be used as well as citric acid. Flavors can be included at about 2 to 40 percent. Preservatives can be added if desired, but Brown, et al. states that they " . . . are generally not necessary for shelf stability due to the reduced water activity and/or reduced pH of the flavoring". In order to affect water activity levels and maintain them below 0.84, Brown, et al. specifies the use of sweeteners at levels of "at least 40%" (paragraph [0020]) or an amount "effective to provide the flavoring with a sweetness of about 50 to 65 degrees Brix" (paragraph [0025]). Brown, et al. provides a list of suitable sweeteners including "fructose, glucose, sucrose, galactose, xylitol, mannitol, sorbitol, polyol, erithritol, maltitol, honey, high fructose corn syrup, the like and combinations thereof" (paragraph [0024]). This high amount of sweetener increases viscosity of the liquid flavoring, and for this reason particular attention is paid to the dispensing nozzle to provide a specific mass flow in Brown, et al. Brown, et al. does not disclose a beverage enhancer product in which non-water solvents with humectant properties (or non-aqueous liquids as referred to in Brown, et al.) such as propylene glycol, glycerol or other alcohols are the primary ingredient used to control water activity. Further, Brown repeatedly states that non-aqueous liquids like propylene glycol, glycerol or other alcohols should not comprise more than 30% of the formula (paragraphs [0019], [0020], and [0028]). Brown, et al. also notes that "keeping the amount of non-aqueous liquids below about 30% can be beneficial to avoid contributing off flavor notes to the beverage" (paragraph [0028]). It would be advantageous to provide a liquid beverage enhancer that is shelf-stable and delivers sweetness, flavor and color to a beverage but does not require such high amounts of the sugars or other sweeteners identified in Brown, et al.

Therefore, there remains the need for a liquid beverage enhancer that is compatible with beverages besides water, and does not require preservatives, low pH (<3), thermal processing, or high sugar levels in order to maintain commercial sterility.

SUMMARY OF THE INVENTION

The present invention provides for a liquid beverage enhancer product, including a shelf-stable highly concentrated liquid flavor and color solution including at least 10% non-water solvents with humectant properties.

The present invention provides for the liquid beverage enhancer product further in combination with a beverage such as milk, yogurt drinks, milkshakes, almond milk, soy milk, rice milk, coconut milk, protein containing beverages, smoothies, water, sparkling water, juice, soft drinks, alcoholic beverages, tea, and coffee.

The present invention further provides for the liquid beverage enhancer product further in combination with a non-beverage food product such as ready to eat frosting, whipped cream, cream cheese, ice cream, cake batter, and plain yogurt.

The present invention also provides for a method of enhancing a beverage by adding a liquid beverage enhancer product including a shelf-stable highly concentrated liquid flavor and color solution having at least 10% non-water solvents with humectant properties to a beverage, and enhancing the flavor and color of the beverage.

The present invention provides for a method of enhancing milk, milk substitute beverages, and protein containing products by adding a liquid beverage enhancer product including a shelf-stable, highly concentrated liquid flavor and color solution having at least 10% non-water solvents with humectant properties and a pH of greater than 4.6 to milk, milk substitute beverages, or protein containing products, and enhancing the flavor and color of the milk, milk substitute beverages, or protein containing products without curdling.

DESCRIPTION OF THE DRAWINGS

Other advantages of the present invention are readily appreciated as the same becomes better understood by reference to the following detailed description when considered in connection with the accompanying drawings wherein.

DETAILED DESCRIPTION OF THE INVENTION

The present invention provides for liquid beverage enhancer products made shelf-stable by reducing water activity to a level that no longer sustains growth of most food spoilage microorganisms (yeasts, molds and bacteria) via inclusion of high levels of non-water solvents with humectant properties such as, but not limited to, propylene glycol, glycerol, ethanol, and other alcohols.

The present invention enables multiple significant improvements to current liquid water enhancer products including shelf-stable liquid beverage enhancers with a high pH (greater than 4.6) that do not need to be pasteurized or otherwise processed, shelf-stable liquid beverage enhancers that can be free of traditional preservatives, and shelf-stable liquid beverage enhancers that are considered "natural", "all-natural", or "organic".

Figure 1:
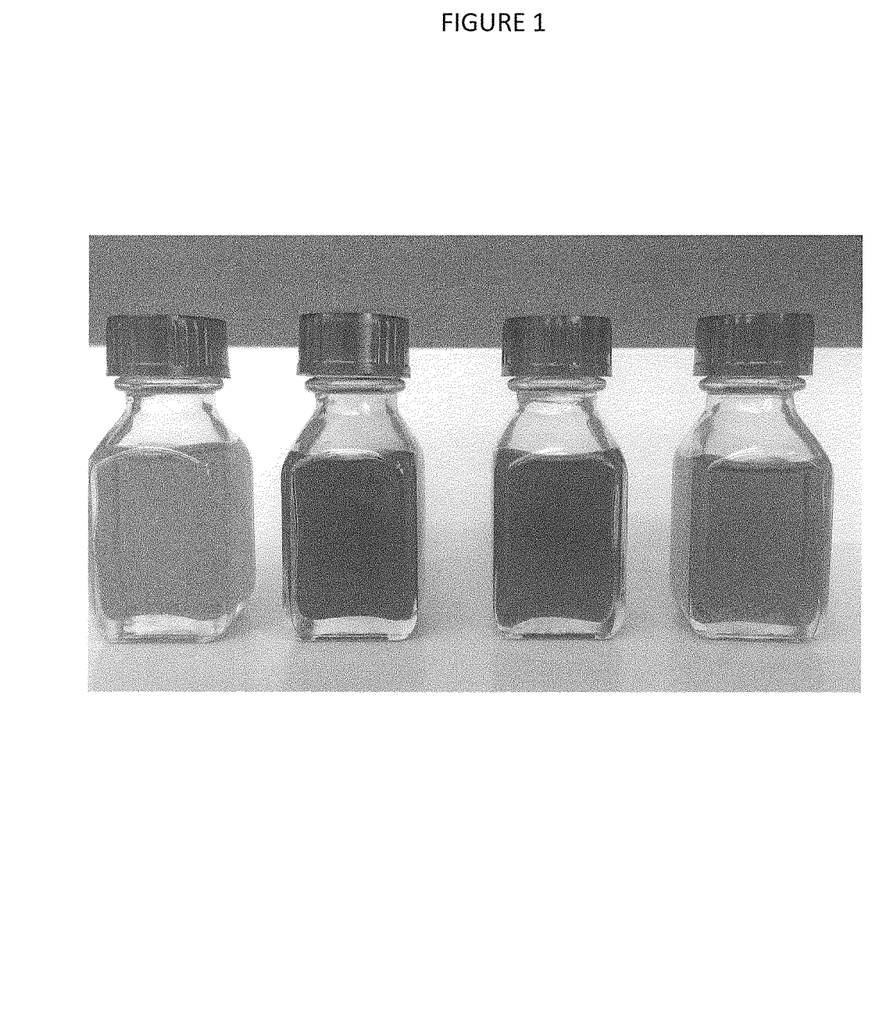
FIG. 1 is a photograph of the liquid beverage enhancers.

"Liquid beverage enhancer" products, as used herein, are highly concentrated liquid flavor and color solutions intended to be added to a beverage or other food products in small concentrations (0.1-10 mLs per 8-12 fl oz serving) for the purpose of improving its taste and appearance. Examples of these liquid beverage enhancers are generally shown in FIG. 1 in various colors.

These liquid beverage enhancers can add many different flavors to beverages, such as, but not limited to, confectionary flavors (chocolate, caramel), fruit flavors, tea, spice, herb, or any other suitable flavor. Some of these flavors can have superior taste at higher pH's, i.e. above 4.6.

The formulation of the present invention uses food grade ingredients including non-water solvents with humectant properties such as glycerol, propylene glycol, and/or alcohols (such as ethyl alcohol) in amounts that reduce the water activity of the liquid beverage enhancer to levels that prohibit the growth of most common food and beverage microbiological contaminants (approximately below 0.90, and preferably below 0.85).

Since the low water activity (<0.90 or <0.85) environment prohibits the growth of microorganisms, the need for added preservatives is negated. Typical preservatives, such as sodium benzoate and potassium sorbate can have a negative taste impact and are perceived by consumers to have negative health risks. A product formulated without such ingredients would therefore be preferred by consumers. There are other negative effects of using sodium benzoate, specifically, in beverage concentrates. The formation of benzoic acid is common when the benzoate interacts with high concentrations of acid, which can cause fall out and crystallization in such concentrated formulas. To address this, additional steps are needed to pre-dissolve the sodium benzoate during batching. Another issue posed by the use of sodium benzoate is the potential formation of benzene. The U.S. Department of Health and Human Services (DHHS) has classified benzene as A1, a confirmed human carcinogen. Benzene results from a metal catalyzed hydroxyl radical reaction between vitamin C (ascorbic acid) and benzoic acid derived from sodium or potassium benzoate. Allowing for a preservative free system eliminates the potential for these unwanted interactions and enables a liquid beverage enhancer product containing vitamin C.

Since preservatives like sodium benzoate and potassium sorbate (among others) are not "natural", the need for such ingredients is a key barrier to the development of a "natural", "all-natural", "100% natural", or "organic" liquid beverage enhancer product. Because the liquid beverage enhancer of the present invention is formulated in a way that eliminates the need for preservatives, a "natural" product can be made by incorporating a natural humectant/solvent such as glycerol (instead of propylene glycol). Such a product could also be considered "100% natural" if the solvents used in the flavor components themselves were also natural (i.e. natural forms of glycerol and/or ethanol instead of propylene glycol). Such products are viewed positively by consumers and enable increased product distribution into retail channels that do not allow non-natural and/or preserved products (such as Whole Foods) and in the "natural" section of more traditional retail stores.

One application of the present invention enables a product to be at a high pH (greater than pH 4.6) while maintaining commercial shelf stability. Such a product does not require preservatives or sterilization processes (thermal, irradiation, high pressure, etc.) The formulation results in a microbiologically stable system and a product that can be manufactured without a requirement to thermally process and file the production process with the FDA. If the water activity of a product is below 0.85, it does not meet the definition of a low acid canned food and, thus, is not subject to FDA regulation. According to the US Food & Drug Administration, "a low-acid canned food (LACF) is any food (other than alcoholic beverages) with a finished equilibrium pH greater than 4.6 and a water activity greater than 0.85". Such regulation would dictate the use of an approved thermal process. While it would theoretically be possible to make a shelf-stable product through the use of a thermal process, it is not desired as it involves expensive equipment and operations and would degrade the integrity of the desired flavors and colors (especially natural flavors and colors), and reduce the shelf life of the product after being opened by consumers.

However, the liquid beverage enhancer can optionally be made shelf-stable through thermal, high pressure, irradiation, or ultraviolet (UV) processing. Also, the liquid beverage enhancer can have a pH below 4.6 while still being shelf-stable without sterilizing methods.

Another application of the present invention is a liquid beverage enhancer that can be used with beverages such as, but not limited to, milk, yogurt drinks, milkshakes, milk substitute products (almond milk, soy milk, rice milk, coconut milk), protein containing beverages, smoothies, water, sparkling water, soft drinks, juice, alcoholic beverages, tea, and coffee. The liquid beverage enhancer can further be used with non-beverage food products that can benefit from flavor enhancement, such as, but not limited to, ready to eat frosting, whipped cream, cream cheese, ice cream, cake batter, other baked good, or plain yogurt.

Figure 2:
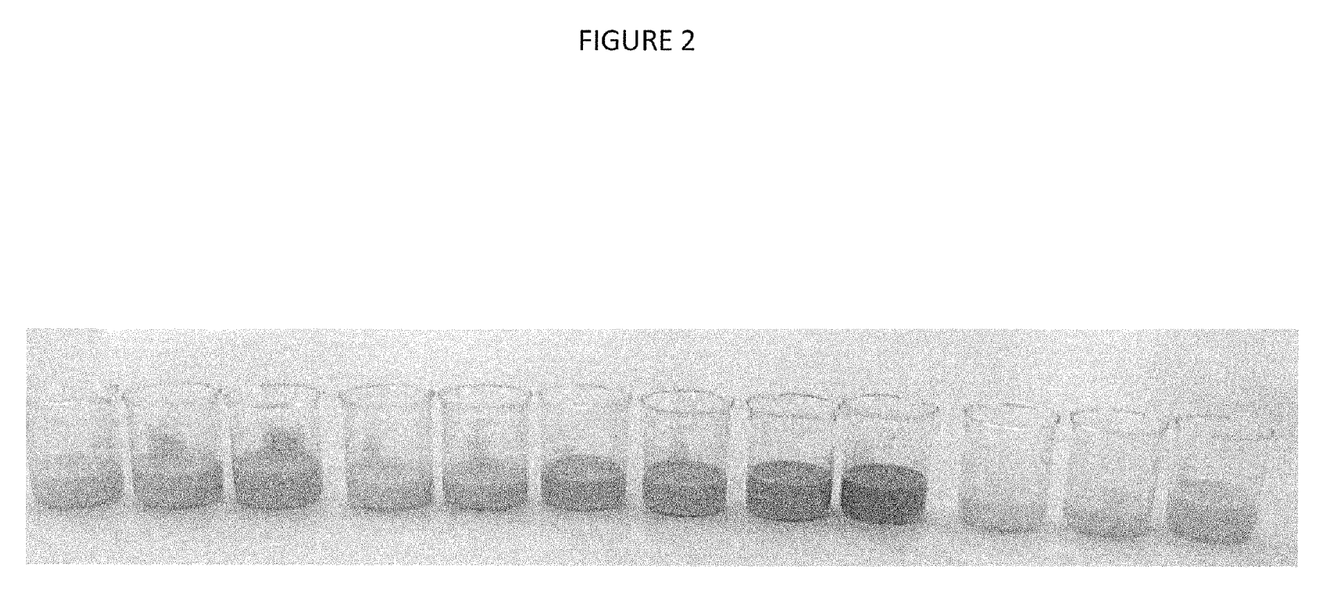
FIG. 2 is a photograph of the liquid beverage enhancers mixed with milk that shows the uniform distribution of color and flavor without any curdling of proteins.

In one application, the beverage is milk and the liquid beverage enhancer is otherwise known as a liquid milk enhancer. The liquid milk enhancer can be added to milk in a small dosage (approximately 2 mL into 8 fl oz of milk) for the purpose of enhancing its flavor and color. After mixing the liquid milk enhancer with milk, the milk is colored as shown in FIG. 2. In the liquid milk enhancer application (or other applications involving dairy components), it is critical to have a product with a pH greater than pH 4.6 and preferably greater than 5.0 in order to avoid milk, dairy, or other protein-containing products curdling upon addition.

TABLE 1 shows the relationship between pH and milk curdling in this application and demonstrates that a milk enhancer with a pH of greater than 5.0 will not curdle the milk upon addition.

TABLE 1

| pH of liquid milk enhancer concentrate | Observations upon incorporation of 2 mls into 8 oz of 2% milk |
|---|---|
| 3.5 | Significant curdling |
| 4.0 | Moderate curdling |
| 4.5 | Little curdling |
| 5.0 | No curdling |

A typical formulation of the liquid beverage enhancer for both water and milk (or other protein containing) applications can contain ingredients with ranges indicated in TABLE 2. The manufacturing process is simple and known in the art as all ingredients merely need to be added to a tank and mixed until a homogenous product is created.

TABLE 2

| Ingredients | Water Formula | Dairy Formula |
|---|---|---|
| Flavors & Colors | 5-90% | 5-90% |
| Water | 0-70% | 0-70% |
| Propylene Glycol, Glycerol and/or other non-water solvents with humectant properties | 10-70% | 20-70% |
| High Intensity Sweeteners | 0-30% | 0-30% |
| Sugar | 0-40% | 0-40% |
| Citric (or other) Acid | 0-40% | 0-10% |

Multiple non-water solvents with humectant properties can be used, such as, but not limited to, propylene glycol, glycerol, ethanol, isopropyl alcohol, propanediol, and combinations thereof. Other alcohols, sugar alcohols such as sorbitol and maltitol, and solutions containing sugar, honey, agave or HFCS (high fructose corn syrup) can optionally be used. Blends of these ingredients can also be used. While at least 10% non-water solvents with humectant properties can be used, preferably at least 30% are used. For a non-natural product, propylene glycol is a preferred solvent/humectant from a cost and efficacy standpoint. For a natural product, glycerol (or glycerine) is the most preferred solvent/humectant. The exact levels of these solvents can vary depending on the specific flavor and color combination needed. Humectants in general are substances that promote the retention of moisture. Non-water solvents with humectant properties are liquids that perform this function.

The liquid beverage enhancer of the present invention does not require sugars in order to deliver sweetness or reduce water activity. The liquid beverage enhancer, instead, delivers sweetness primarily through the use of high intensity sweeteners. The high intensity sweeteners include, but are not limited to sucralose, *stevia*, monk fruit, acesulfame potassium, aspartame and saccharin. While the use of sugars is not necessary, these ingredients can be used in conjunction with high intensity sweeteners if desired. The total amount of sugars used is less than 40% and preferably, 0 to 10%. The total amount of high intensity sweeteners is 0 to 30% and preferably 0 to 10%. The liquid beverage enhancer itself can have a perceived effective sweetness level greater than that of a 65 degrees Brix sugar in water solution, and preferably, greater than that of a 100 degrees Brix sugar in water solution. Preferably, the perceived sweetness level of the liquid beverage enhancer itself is 4 to 15 times greater than that of a 65 degrees Brix sugar in water solution. For example, the liquid beverage enhancer can have an effective sweetness level of greater than 600 degrees Brix.

The liquid beverage enhancer can further include vitamins such as, but not limited to, Vitamin A, Vitamin $B_1$, Vitamin $B_2$, Vitamin $B_3$, Vitamin $B_5$, Vitamin $B_6$, Vitamin $B_{12}$, Vitamin C, Vitamin D, Vitamin E, Vitamin K, and combinations thereof. The liquid beverage enhancer can also include electrolytes such as, but not limited to, sodium, potassium, calcium, magnesium, chloride, hydrogen phosphate, and hydrogen carbonate, and other soluble salts, acids, and bases. The pH of the liquid beverage enhancer can be adjusted to keep the vitamins from breaking down. Natural colors or other botanicals that are not stable in low pH systems can also be added. Other functional ingredients can also be included such as, but not limited to protein, caffeine, green coffee extract, guarana, melatonin, L-Theanine, glucosamine, chondroitin, chamomile, CLA (conjugated linoleic acid), L-carnitine, omega-3, docosahexanoic acid (DHA), and quercetin. The liquid beverage enhancer can further include fruit juice, fruit juice concentrate, vegetable juice, vegetable juice concentrate, and combinations thereof.

The liquid beverage enhancer can also include therapeutics and active agents that can be added to a beverage, and can especially include therapeutics that are not soluble or stable at low pH. The therapeutics can include, but are not limited to, anti-pain agents, anti-inflammatory agents (such as non-steroidal anti-inflammatory drugs (NSAIDS), statins, ibuprofen), narcotics, anti-cancer agents, biologics, anti-infective agents, hormones, diabetes treatments, heart and circulatory drugs, respiratory agents, gastrointestinal agents, genitourinary agents, central nervous system agents, neuromuscular agents, nutritional supplements, blood modifying agents, and any other suitable therapeutic. The therapeutics can include a prodrug or liposomal coating to aid in delivery once in the body.

The liquid beverage enhancer can also add flavor to beverages or food products without modifying its original acid or sweetness profile if desired, e.g. adding a vanilla top-note to a cola beverage.

The present invention provides for a method of enhancing a beverage, by adding the liquid beverage enhancer described above that is shelf-stable and a highly concentrated liquid to a beverage, and enhancing its flavor and color. This liquid beverage enhancer product can be high pH, preservative-free, and/or labeled as natural. The liquid beverage enhancer can be added by a user according to how much flavor and color that they desire or in a set amount. The liquid beverage enhancer can be packaged in a bottle and added directly to the beverage by squeezing the bottle, pouring the liquid beverage enhancer from the bottle, or letting drops of the liquid beverage enhancer drop into the beverage. Other methods of addition can be used. Once the liquid beverage enhancer has been added into the beverage, the user can mix the beverage by stirring or shaking (if a closed container).

The present invention also specifically provides for a method of enhancing milk, by adding the liquid milk enhancer that has a pH greater than 4.6, and preferably greater than 5 as described above, and enhancing the flavor and color of the milk. The liquid milk enhancer can be added by a user according to how much flavor and color that they desire or in a set amount. The liquid milk enhancer can be packaged in a bottle and added directly to the milk by squeezing the bottle. Once the liquid milk enhancer has been added into the milk, the user can mix the milk by stirring or shaking (if a closed container). It should be understood that any dairy or protein containing product or milk substitute beverage can be used with the liquid milk enhancer, not just milk.

The liquid beverage enhancer of the present invention overcomes the disadvantages of the prior art by eliminating the need for preservatives and expensive processing methods. The present invention enables a liquid beverage enhancer product to be "natural", "all-natural", and/or "organic". The invention further enables a liquid beverage enhancer to be formulated at a high pH without thermal processing which allows such products to be used in milk (or other protein-containing beverages) without causing curdling. It also enables the improved delivery of non-citrus or fruit based flavors, in which the flavor profile is benefitted from a mostly non-acidified environment and enables a product which can improve the flavor and color of a beverage without impacting its acidity. The liquid beverage enhancer is further different from the concentrated liquid flavorings of Brown, et al. because instead of high concentrations of sugars to reduce water activity, the present invention uses non-aqueous liquids (i.e. the non-water solvents with humectant properties described above) to reduce water activity. The present invention does not require sugar to be shelf stable.

The invention is further described in detail by reference to the following experimental examples. These examples are provided for the purpose of illustration only, and are not intended to be limiting unless otherwise specified. Thus, the invention should in no way be construed as being limited to the following examples, but rather, should be construed to encompass any and all variations which become evident as a result of the teaching provided herein.

Example 1

The following are sample formulations.
All example formulations are made using the following processing instructions: Dissolve dry ingredients in water (Sugar, Citric Acid, Acesulfame Potassium, Sucralose, Sodium Citrate). Check to ensure all solids are dissolved. Add propylene glycol, glycerol and/or other solvents/humectants and mix well. Add flavor and color and mix well.

A Liquid Beverage Enhancer meant to deliver a lemongrass mint tea flavor and color that can be labeled as "natural" is shown in TABLE 3. This natural product is made by addition of glycerol and has a low water activity (aw=0.848).

TABLE 3

| Lemongrass Mint Natural Green Tea | % Range w/w |
|---|---|
| Citric Acid | 0-20% |
| Sugar_Cane | 0-40% |
| Potassium citrate | 0-10% |
| Stevia Leaf Extract | 0-5% |
| Green Tea Extract and Aroma | 0-50% |
| Caramel Color | 0-30% |
| Glycerol | 15-40% |
| Natural Flavor | 0-20% |
| Water | 10-50% |

An All-Natural Milk Enhancer which can be added into milk without causing curdling is shown in TABLE 4. This product has a pH above 5.0 and is made shelf-stable via the addition of glycerol as the solvent/humectant at a level sufficient to reduce water activity to approximately 0.85 or below.

TABLE 4

| Natural Strawberry Milk Enhancer | % (w/w) |
|---|---|
| Sugar | 0-10% |
| Citric Acid | 0-5% |
| Natural Sweetener Blend (Stevia/Monk Fruit) | 0-5% |
| Glycerol | 20-50% |
| Sodium Citrate | 0-10% |
| Natural Flavor | 0-30% |
| Natural Color | 0-40% |
| Water | 20-60% |

A preservative-free liquid milk enhancer which can be added to milk without causing curdling is shown in TABLE 5. This product has a pH above 5.0 and is made shelf-stable via the addition of propylene glycol to reduce water activity to approximately 0.85 or below.

TABLE 5

| Preservative-Free Strawberry Milk Enhancer | % (w/w) |
|---|---|
| Sugar | 0-10% |
| Citric Acid | 0-5% |
| Acesulfame Potassium | 0-5% |
| Sucralose | 0-5% |
| Propylene Glycol | 20-60% |
| Sodium Citrate | 0-10% |
| Natural Flavor | 0-30% |
| Water | 20-60% |

If desired, preservatives can be added to a liquid milk enhancer product, although they are not necessary. This preserved product, shown in TABLE 6, has a pH above 5.0 and includes propylene glycol at a level sufficient to reduce water activity to approximately 0.85 or below.

TABLE 6

| Preserved Strawberry Milk Enhancer | % Range (w/w) |
|---|---|
| Potassium Sorbate | 0-0.06% |
| Sugar | 0-10% |
| Citric Acid | 0-5% |
| Acesulfame Potassium | 0-5% |
| Sucralose | 0-5% |
| Propylene Glycol | 20-60% |
| Sodium Citrate | 0-10% |
| Natural Flavor | 0-30% |
| Water | 20-60% |

A formula for an all-natural liquid water enhancer with Vitamin C is shown below in TABLE 7. This product eliminates the risk of potential benzene formation since sodium benzoate is not used as a means of creating shelf-stability.

TABLE 7

| All Natural Water Enhancer with Vitamin C | |
|---|---|
| Ingredient | % w/w |
| Water | 10-50% |
| Glycerol | 10-40% |
| Citric Acid | 0-30% |
| Natural Flavor | 0-50% |
| Stevia Leaf Extract | 0-10% |
| Sugar | 0-30% |
| Monk Fruit Extract | 0-10% |
| Ascorbic Acid | 0-10% |
| Sodium Citrate | 0-10% |
| Lactic Acid (90%) | 0-5% |
| Natural Color | 0-10% |

A formula for a preservative-free, all natural liquid beverage enhancer with electrolytes and vitamins is shown in TABLE 8 below:

TABLE 8

| All-Natural Water Enhancer with Electrolytes | |
|---|---|
| Ingredient | % w/w |
| Water | 10-50% |
| Glycerol | 10-40% |
| Citric Acid | 0-30% |
| Natural Flavor | 0-50% |
| Sodium Chloride | 10-30% |
| Potassium Phosphate | 0-30% |
| Stevia Extract | 0-10% |
| Monk Fruit Extract | 0-10% |
| Niacinamide | 0-5% |
| Vitamin B6 | 0-1% |
| Vitamin B12 | 0-1% |
| Potassium Citrate | 0-5% |

Example 2

The amount of propylene glycol (or other suitable solvent i.e. glycerol) is a critical aspect of controlling water activity in these Liquid Beverage Enhancer products. Ideally, the water activity should be below 0.85, although it is possible that a Liquid Beverage Enhancer product can be commercially shelf-stable at a water activity slightly above 0.85. The exact water activity to deliver shelf-stability is dependent on formulation, ingredients, package and process conditions.

Figure 5A:
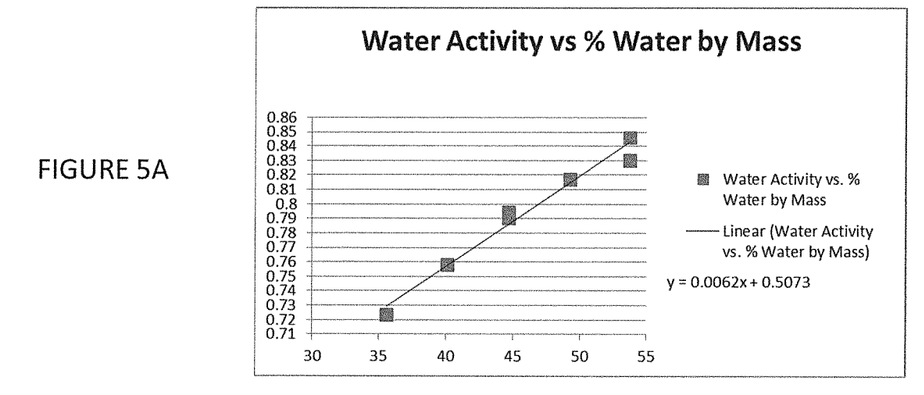
FIG. 5A is a graph of water activity versus percent water by mass and FIG. 5B is a graph of water activity versus percent PG by mass.
Figure 5B:
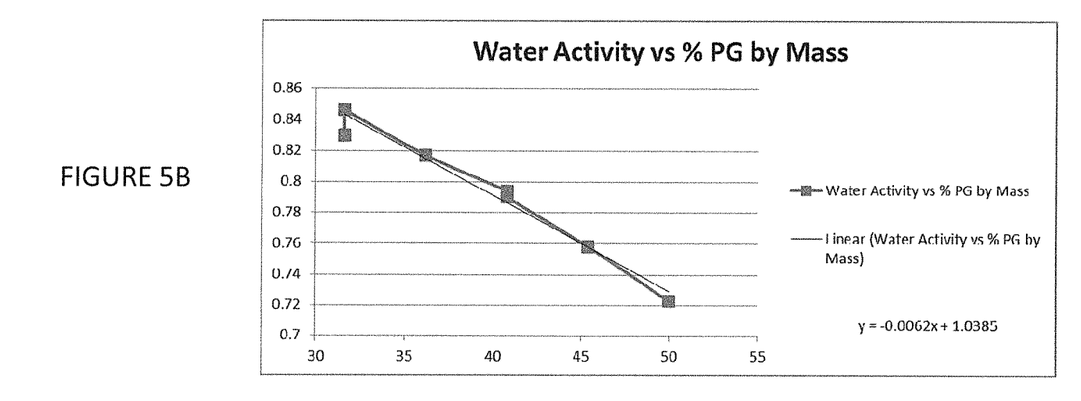

In order to find a correlation between % w/w PG and water activity, increasing amounts of propylene glycol were added to a base product formulation. The water activity results are shown below in TABLE 9. FIGS. 5A-5B show the correlation determined between water activity, % w/w PG, and % w/w water.

TABLE 9

| Sample Number | % w/w Water | % w/w Propylene Glycol | $a_w$ | Temp (° F.) |
|---|---|---|---|---|
| Sample #1 | 53.8 | 31.6 | 0.846 | 20.84 |
| Sample #2 | 49.3 | 36.2 | 0.817 | 20.87 |
| Sample #3 | 44.7 | 40.8 | 0.790 | 20.81 |
| Sample #4 | 40.1 | 45.4 | 0.758 | 20.81 |
| Sample #5 | 35.6 | 50.0 | 0.723 | 20.85 |

Example 3

TABLE 10 shows aerobic plate counts, water activity, and yeast and mold counts for Liquid Beverage Enhancer products produced in a 100 gallon trial batch. The data in TABLE 10 is from samples from this batch that were sent for micro and water activity testing immediately after production

TABLE 10

| PRODUCT DESCRIPTION | AEROBIC PLATE COUNT (FDA/BAM) (CFU/G) | WATER ACTIVITY | YEAST AND MOLD (ISO-GRIND) (count/mL) |
|---|---|---|---|
| Strawberry | <1 | 0.822 at 21.62° C. | <1 |
| Chocolate | <1 | 0.757 at 21.58° C. | <1 |

Samples from this same 100 gallon trial were stored at 100° F. for one month. These samples were then sent for micro testing with the results shown in TABLE 11. There are two data points listed for the strawberry formulation. One bottle of the strawberry product was opened and exposed to air once per week to simulate use after purchase by a consumer. The other bottle was unopened during the 1 month storage at 100° F. The chocolate sample was pulled from an unopened bottle. This data is further proof that these products are commercially shelf-stable even after opening and frequent use.

TABLE 11

| PRODUCT DESCRIPTION | AEROBIC PLATE COUNT (FDA/BAM) (CFU/G) | STORAGE CONDITIONS | YEAST AND MOLD (ISO-GRIND) (count/mL) |
|---|---|---|---|
| Strawberry | 8 | Unopened after 1 month at 100° F. | <1 |
| Strawberry | 15 | Opened weekly at 1 month at 100° F. | <1 |
| Chocolate | <1 | Unopened after 1 month at 100° F. | <1 |

Example 4

A challenge test was conducted to evaluate the survival of microorganisms in a Strawberry Liquid Milk Enhancer.

Standardized suspensions of the following microorganisms were used to conduct this study: *Penicillium corylophilum* (ATCC 18307), *Zygosaccharomyces bailii* (ATCC 36947), *Escherichia coli* (ATCC 8739), *Aspergillus brasiliensis* (ATCC 16404), *Saccharomyces cerevisiae* (ATCC 9896), *Lactobacillus casei* (ATCC 11578), and *Clostridium perfringens* (ATCC 3624).

Each organism was prepared by growing overnight cultures of each microorganism in Trypticase Soy Broth (TSB) with 10% glucose at 35±1° C. to acclimate the organisms to a lower pH, and adjusting concentrations to result in a final pooled inoculum concentration of $10^2$-$10^3$ cells/gram of sampled product.

Methodology

Following organism inoculation, the test material was held at ambient temperature (23-25° C.) for the duration of the study. Microbiological analyses were conducted according to the methodologies outlined in the FDA Bacteriological Analytical Manual, the Compendium of Methods for the Microbiological Examination of Foods, 4th Edition. The test materials were analyzed at weekly time intervals of Initial (immediately after inoculation), Week 1, Week 2, Week 3, Week 4, Week 5 and Week 6. The $A_w$ of the test product was conducted prior to inoculation.

Results

Figure 3A:
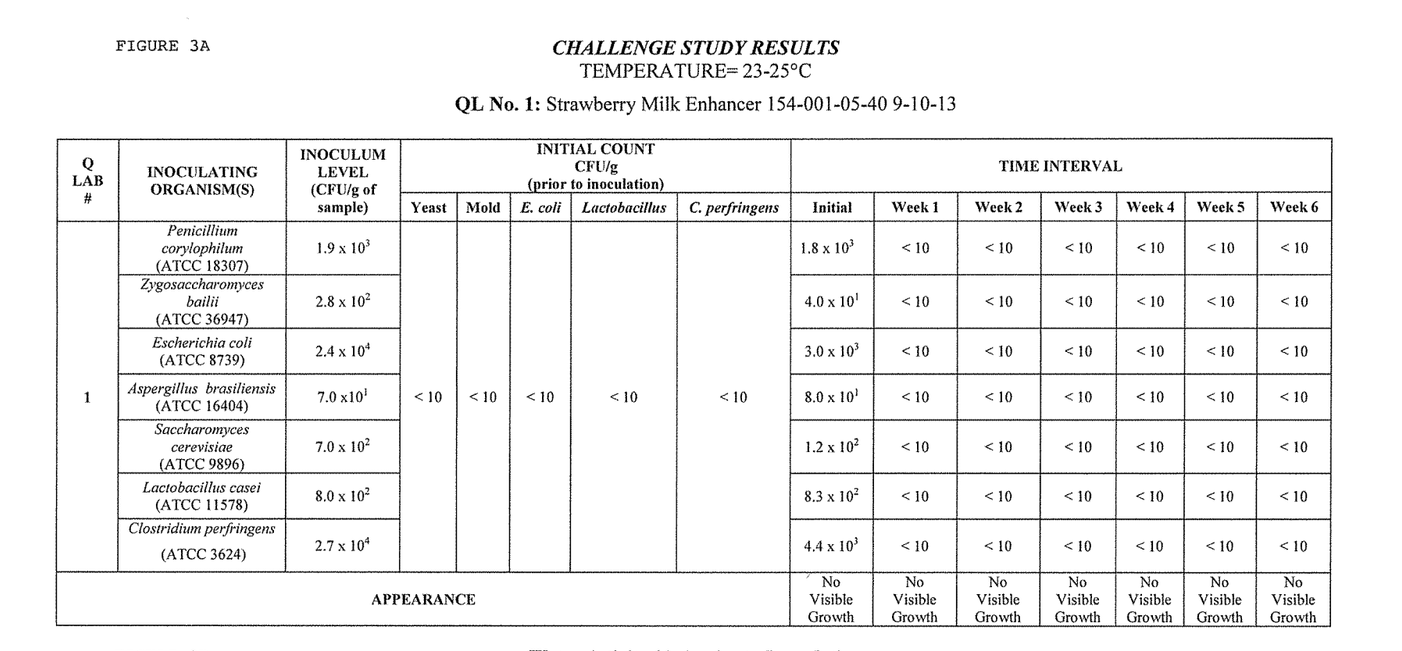
FIG. 3A is a table of challenge study results for Strawberry Milk Enhancer and FIG. 3B is a table of water activity prior to inoculation, indicating that the liquid beverage enhancer is microbiologically stable.
Figure 3B:
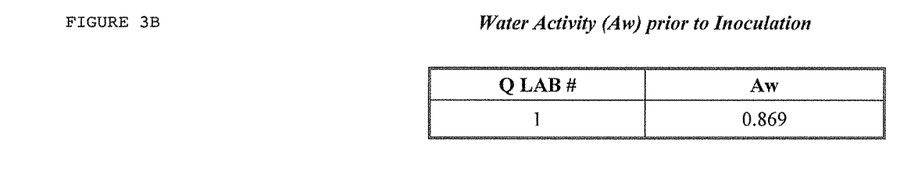

The results of the study are shown in FIG. 3A and show that these products are commercially shelf-stable. FIG. 3B shows that these Liquid Beverage Enhancer formulations can be commercially shelf-stable at a water activity slightly greater than 0.85.

Example 5

This experiment was conducted to evaluate the survival of challenge microorganisms in Lemongrass Mint Natural beverage enhancer.

Standardized suspensions of the following microorganisms were used to conduct this study: *Penicillium corylophilum* (ATCC 18307), *Zygosaccharomyces bailii* (ATCC 36947), *Escherichia coli* (ATCC 8739), *Aspergillus brasiliensis* (ATCC 16404), *Saccharomyces cerevisiae* (ATCC 9896), and *Lactobacillus casei* (ATCC 11578).

Methodology

Following organism inoculation, the test material was held at ambient temperature (23-25° C.) for the duration of the study. Microbiological analyses were conducted according to the methodologies outlined in the FDA Bacteriological Analytical Manual, the Compendium of Methods for the Microbiological Examination of Foods, 4th Edition. The test materials were analyzed at weekly time intervals of Initial (immediately after inoculation), Week 1, Week 2, Week 3, Week 4, Week 5 and Week 6. The $A_w$ of the test product was conducted prior to inoculation.

Results

Figure 4A:
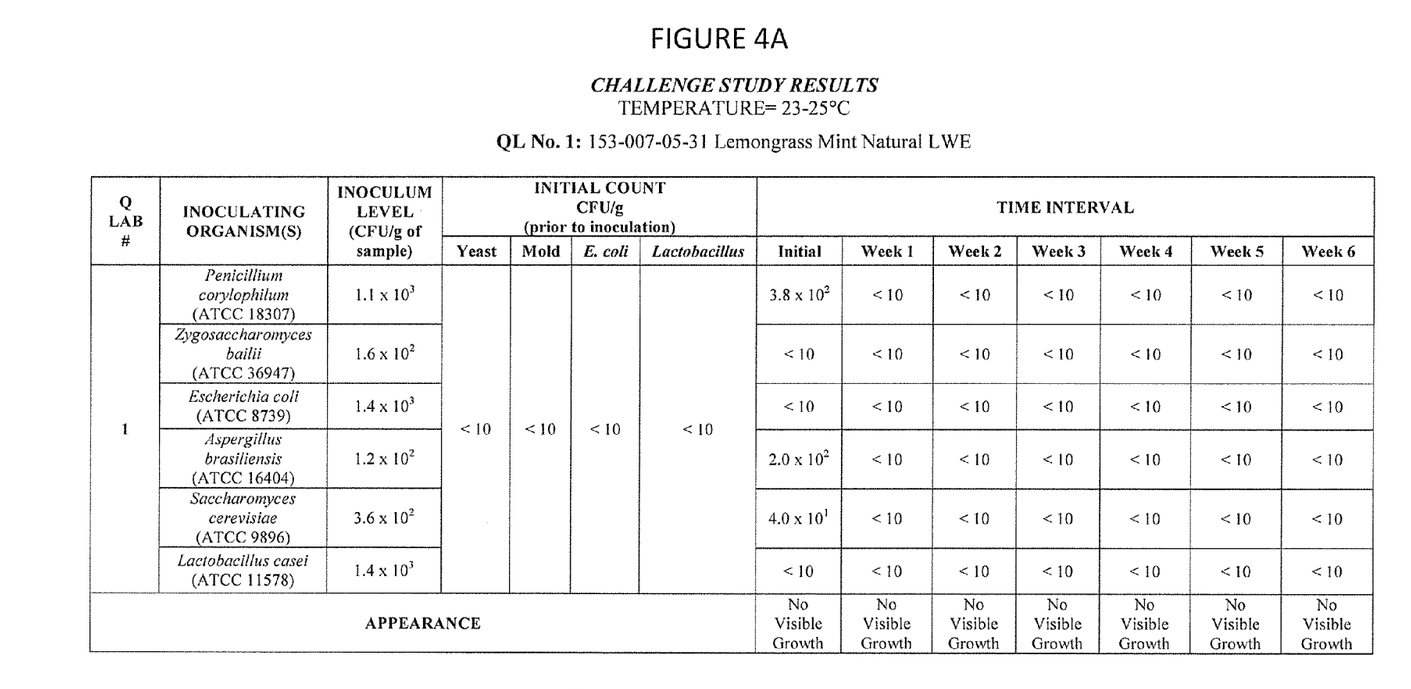
FIG. 4A is a table of challenge study results for Lemongrass Mint Tea Natural liquid beverage enhancer and FIG. 4B is a table of water activity prior to inoculation, indicating that this liquid beverage enhancer formula is microbiologically stable.
Figure 4B:
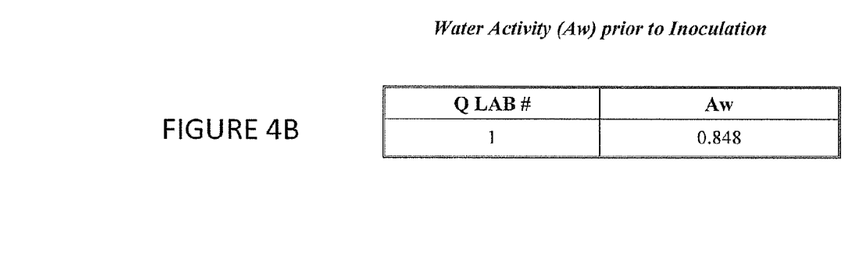

The results of the study are shown in FIGS. 4A and 4B and prove that these products are microbiologically stable.

Example 6

An accelerated shelf-life test was performed in order to gain an understanding of product stability (both physical and flavor/aroma/color) over time. Four flavors of the Liquid Milk Enhancer product were stored at 100° F. for 3 weeks in glass jars and evaluated by a sensory panel.

All four products were physically stable after three weeks at 100° F. with zero evidence of phase separation or ingredients coming out of solution. FIG. 1 shows the homogenous products with no layering or stratification.

All four products also showed a high level of flavor & aroma stability. Nearly all panelists indicated "no difference" or "slight difference" versus control. Very slight differences were mostly observed in the freshness of the aroma in the strawberry and orange products. The cotton candy and chocolate high temperature aged samples were actually preferred in the sensory test as these two profiles smoothed out very nicely. Color was also very stable with all panelists indicating that the aged variable was a visual match to control.

The products were also evaluated for any anomalies when mixing into milk (i.e. curdling) and did not show any issues.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. A method of enhancing milk consisting essentially of the steps of:
    adding a liquid beverage enhancer product including a shelf-stable and physically stable highly concentrated liquid flavor and color solution having at least 10% non-water solvents with humectant properties including propylene glycol and a pH of greater than 4.6 and being free of preservatives sodium benzoate and potassium sorbate to milk; and
    enhancing the flavor and color of the milk without curdling.

2. The method of claim 1, wherein said adding step is performed by a step chosen from the group consisting of squeezing a bottle, pouring a bottle, and dripping a bottle containing the liquid beverage enhancer product into the milk, and a user mixing the milk.

* * * * *